G. H. VINING.
MACHINE FOR SAWING AND TRIMMING TYPE, PLATES, &c.
APPLICATION FILED NOV. 25, 1907.

943,129.

Patented Dec. 14, 1909.

4 SHEETS—SHEET 1.

Witnesses:
R. E. Hamilton.
E. A. Cahill.

Inventor,
George H. Vining,
By F. G. Fischer Atty.

G. H. VINING.
MACHINE FOR SAWING AND TRIMMING TYPE, PLATES, &c.
APPLICATION FILED NOV. 25, 1907.

943,129.

Patented Dec. 14, 1909.
4 SHEETS—SHEET 2.

Witnesses:
R. C. Hamilton
E. A. Cahill

Inventor,
George H. Vining,
By F. G. Fischer atty.

G. H. VINING.
MACHINE FOR SAWING AND TRIMMING TYPE, PLATES, &c.
APPLICATION FILED NOV. 25, 1907.
943,129.
Patented Dec. 14, 1909.
4 SHEETS—SHEET 3.
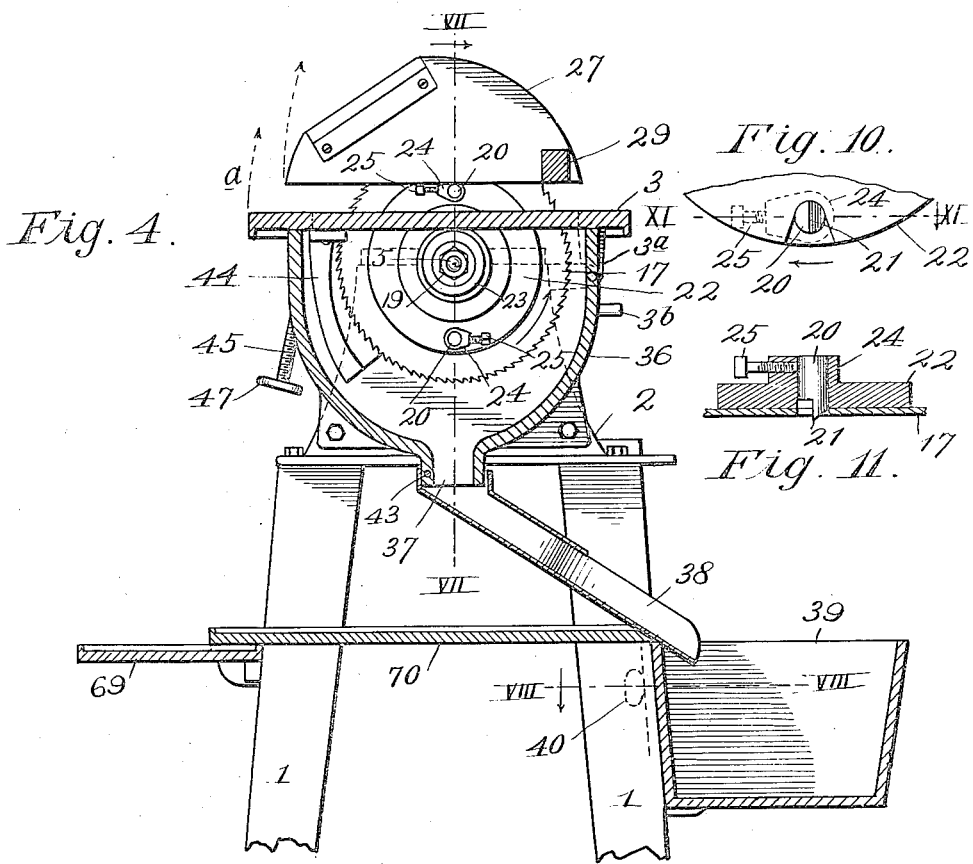
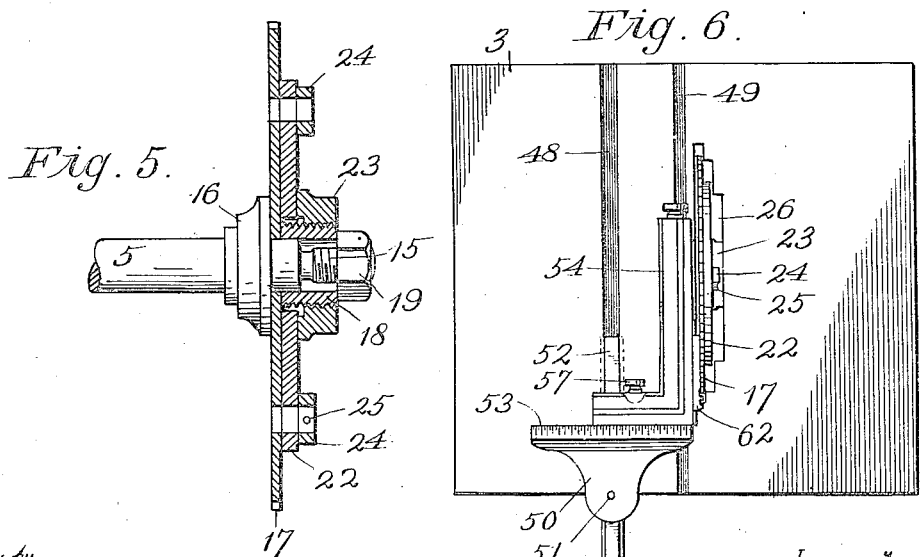
Witnesses:
R. E. Hamilton
E. A. Cahill
Inventor,
George H. Vining,
By F. G. Fischer, Atty.

G. H. VINING.
MACHINE FOR SAWING AND TRIMMING TYPE, PLATES, &c.
APPLICATION FILED NOV. 25, 1907.
943,129.
Patented Dec. 14, 1909.
4 SHEETS—SHEET 4.
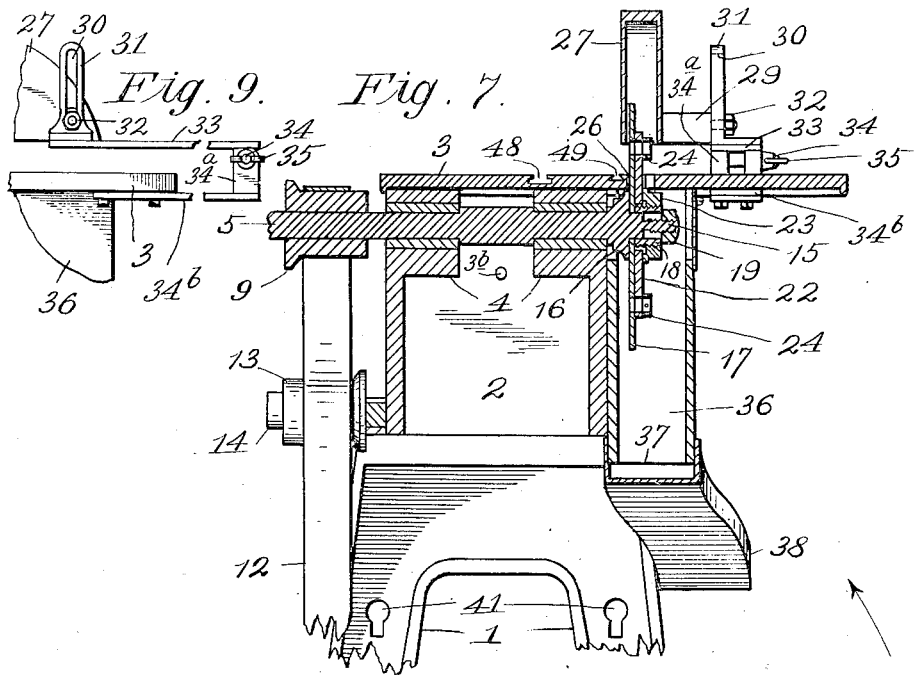
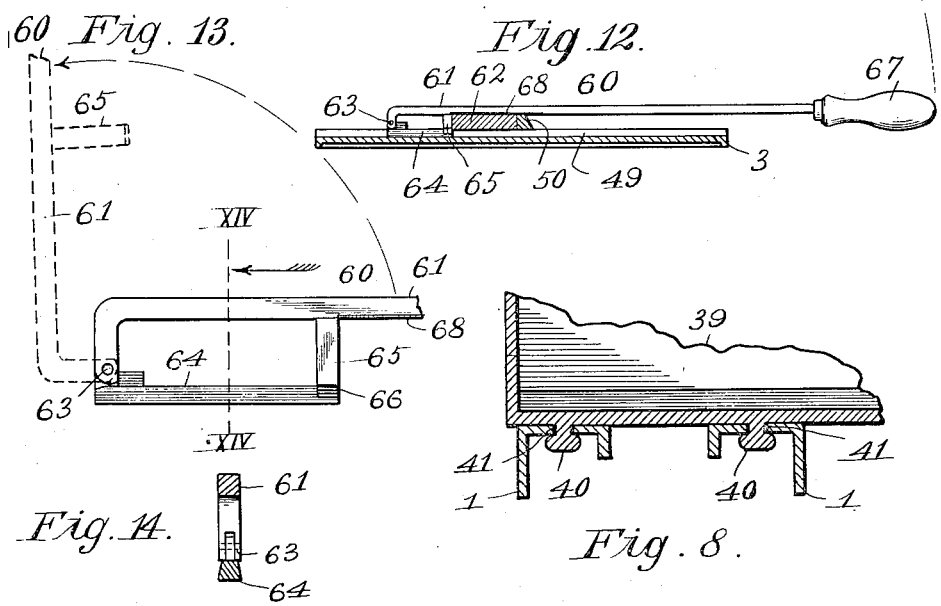
Witnesses:
R. E. Hamilton
E. A. Cahill
Inventor:
George H. Vining,
By F. G. Fischer, Atty.

UNITED STATES PATENT OFFICE.

GEORGE H. VINING, OF KANSAS CITY, MISSOURI.

MACHINE FOR SAWING AND TRIMMING TYPE, PLATES, &c.

943,129. Specification of Letters Patent. Patented Dec. 14, 1909.

Application filed November 25, 1907. Serial No. 403,586.

*To all whom it may concern:*

Be it known that I, GEORGE H. VINING, a citizen of the United States, residing at Kansas City, in the county of Jackson and State of Missouri, have invented certain new and useful Improvements in Machines for Sawing and Trimming Type, Plates, &c., of which the following is a specification.

My invention relates to improvements in machines for sawing and trimming type, plates, &c.; and my objects are first, to provide a machine for sawing and trimming type, linotype slugs, stereotype plates, electroplates, and other plates employed for printing purposes; second, to provide means for beveling plates; third, to provide safeguards for protecting the workman against injury by metal shavings and contact with the circular saw of the machine, and fourth, to provide means for catching and collecting all metal shavings or trimmings.

In order that the invention may be fully understood, reference will now be made to the accompanying drawings, in which:—

Figure 1:
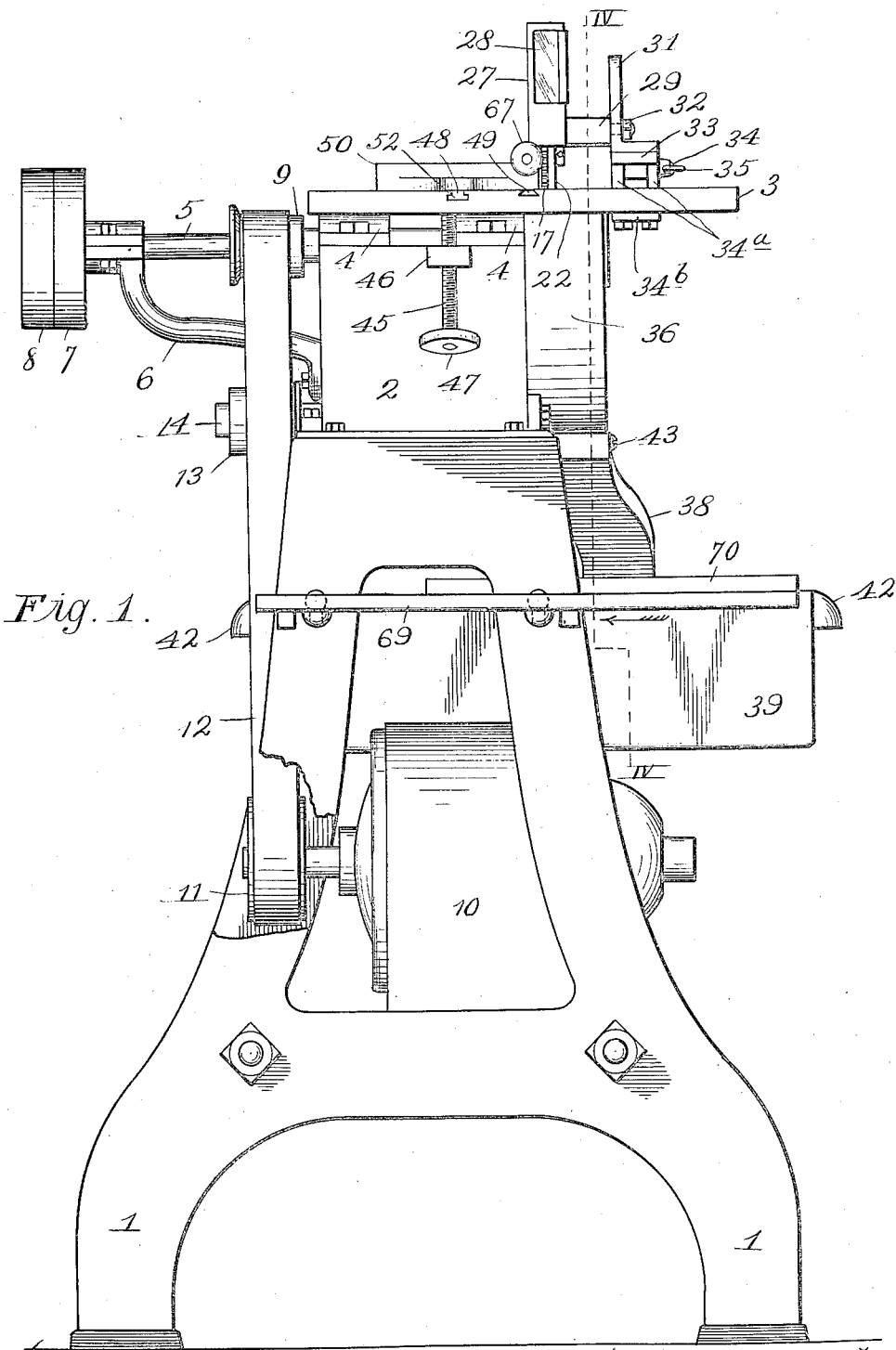
Figure 2:
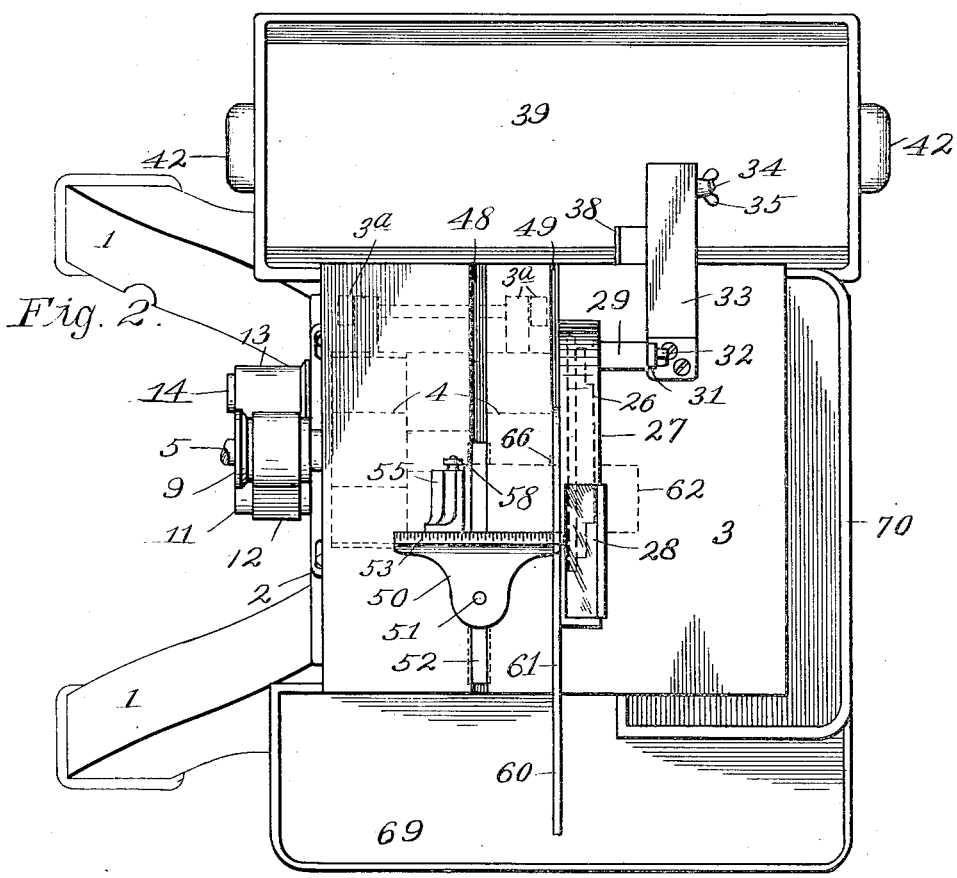
Figure 3:
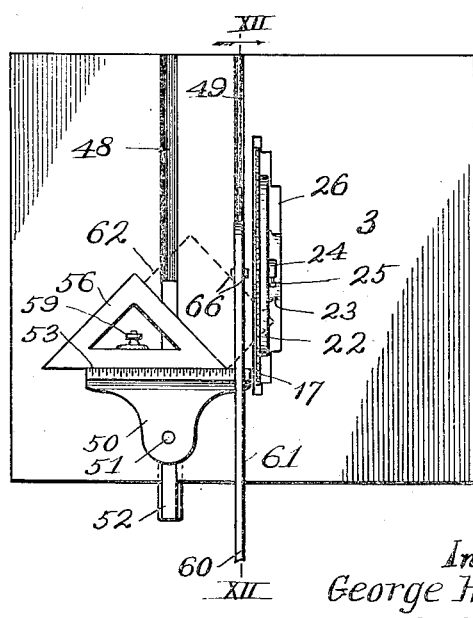

Figure 1 represents a front elevation of my improved machine. Fig. 2 is a plan view thereof. Fig. 3 is a plan view of the adjustable table, carriage, and holder, all of which form part of the invention. Fig. 4 is a broken vertical section on line IV—IV of Fig. 1. Fig. 5 is a central vertical section of the circular saw, disk, and trimmers, forming part of the invention. Fig. 6 is a detail plan view of the adjustable table, carriage, and a modified form of gage adapted to operate in conjunction with the carriage. Fig. 7 is a vertical cross section on line VII—VII of Fig. 4 with some of the parts removed. Fig. 8 is a horizontal section on line VIII—VIII of Fig. 4. Fig. 9 is a broken side elevation of the table, a case which it covers, and a hood adjustably mounted above the table. Fig. 10 is a broken detail of the disk, showing the reverse side to that shown in Fig. 4. Fig. 11 is a horizontal section on line XI—XI of Fig. 10. Fig. 12 is a section on line XII—XII of Fig. 3. Fig. 13 is an enlarged broken side elevation of the holder. Fig. 14 is a vertical section of same on line XIV—XIV of Fig. 13.

In carrying out the invention I employ a stand consisting of four legs 1 suitably united.

2 designates a rectangular frame bolted upon the legs and provided with an adjustable table 3, secured thereto by hinges $3^a$, so that said table may be swung back against a stop $3^b$ projecting rearwardly from the frame. Frame 2 is provided at its upper portion with a pair of bearings 4 in which a shaft 5 is journaled, the outer end of which is journaled in a bracket 6 and extends some distance from one side of the frame, so that a large pulley 7, whereby it may be driven when desired, will be out of the way of large plates upon the table.

8 designates a loose pulley mounted on shaft 5 beside pulley 7, so that the drive belt (not shown) may be shifted from pulley 7 to said pulley 8 when it is desired to stop the machine. Shaft 5 may also be driven by a pulley 9 fixed thereto adjacent to frame 2, but of smaller diameter than pulley 7 so that it will not reach to the top of the table and interfere with the work thereon. Pulley 9 is driven by a motor 10 through the instrumentality of a pulley 11 and an endless belt 12, an idler 13 being employed for tightening said belt. Motor 10 is suitably mounted upon the legs 1 and idler 13 is journaled upon a stub-shaft 14, secured to one side of frame 2.

Shaft 5 is provided near its reduced inner threaded end 15 with a shoulder 16 against which a circular saw 17 is reliably held by a bushing 18, which in turn is secured by a clamping-nut 19 engaging the threaded end 15. By removing said nut the saw may be taken off shaft 5 and replaced by another when desired.

20 designates a pair of trimmers which extend transversely through saw 17 and have their forward cutting ends 21 projecting slightly from one side of the saw so they will trim off the rough surface left on the work by the saw.

Saw 17 is reinforced by a removable disk 22 fitting loosely upon bushing 18 and held against one side of the saw by a nut 23 engaging the external threads of bushing 18. Disk 22 is provided at one side with fixed lugs 24 having set-screws 25 for adjustably holding the trimmers 20 in position. The saw and the disk project through a slot 26 in table 3, and in order to protect the operator from injury by the projecting portion of said saw I cover the same with a hood 27 having a sight opening in its front upper portion, which is closed with a piece of glass 28, so that the operator can examine the work being done by the saw without danger from the flying metal shavings.

Hood 27 is provided with a laterally-projecting arm 29, which extends through the vertical slot 30 in a standard 31, and is held by a nut 32. By loosening said nut the arm and the hood may be adjusted vertically toward or away from the table to accommodate plates of different thicknesses. Standard 31 is fixed to a rearwardly-extending arm 33 pivotally-mounted at its rear end upon a bolt 34 so that it may be swung upwardly and rearwardly with the hood when it is desired to expose the upper portion of the saw, or adjust the hood upwardly with the table. Bolt 34 is carried by a pair of jaws 34$^a$ at the rear end of an arm 34$^b$ secured to table 3, and the threaded end of said bolt is provided with a thumb-nut 35, whereby arm 33 and the hood may be locked at any desired inclination.

That portion of the saw beneath table 3 is inclosed in a case 36 to protect the operator from injury by the saw and in conjunction with hood 27 save all of the metal trimmings which are carried by the saw and trimmers through slot 26 into the case. After entering the case 36 the metal trimmings, or shavings, fall therefrom through a centrally-disposed outlet 37 into a spout 38 which conducts them to a receptacle 39. Receptacle 39 is provided at one side with a pair of knobs 40 adapted to enter key-hole slots 41 in the rear legs 1 and thus detachably secure the receptacle to said legs, so that it may be removed to empty the shavings. For convenience in handling the receptacle it is provided at its ends with handles 42. In order that said receptacle may be removed without injury to spout 38, I pivotally secure the latter to the lower portion of case 36 by a pin 43, see Fig. 4, so that its discharge end may be swung upward out of the way of the receptacle. To prevent the metal shavings from passing out between the upper portion of case 36 and table 3, when the latter is tipped upwardly in the direction of arrow $a$, I provide said table with a depending spout 44 which communicates with the forward end of slot 26 and case 36, so that it will conduct all of the shavings to the latter and also act as a shield in preventing the operator from contacting with the front portion of the circular saw.

Table 3 is adjusted to any desired inclination by a screw 45 extending through an internally-threaded lug 46 and abutting at its upper end against the underside of the table, so that when said screw is turned in one direction the table will be tipped upwardly and when turned in the opposite direction the table will be lowered. To facilitate the turning of the screw I provide its lower end with a hand-wheel 47. Lug 46 is fixed to the upper portion of frame 2, see Fig. 1. The upper portion of table 3 is provided with a T-shaped groove 48 and a dove-tail groove 49 extending preferably the full length thereof, for a purpose hereinafter described.

50 designates a carriage secured by a pivot 51 upon a T-shaped bar 52 slidably arranged in groove 48 so that it, together with the carriage may be moved back and forth on the table. By pivotally mounting the carriage it may be adjusted to any desired angle so that when a plate is placed against its graduated face 53, said plate may be cut off on any desired bevel.

54, 55, and 56 designate gages which may be used in conjunction with the carriage, they being adjustably secured thereto by set-screws 57, 58, and 59, respectively.

When sawing and trimming linotype slugs or other small work, I provide a holder 60 for holding said work in contact either with the carriage or one of the gages. By providing said holder the small work may be handled with the utmost safety as the operator can control the work without placing his fingers close to the saw. Holder 60 embraces a longitudinal clamping-member 61 for engaging the upper surface of the work 62, for the purpose of holding the same upon the table while being slid toward the rear end of the latter during the cutting or trimming operation.

The forward end of clamping-member 61 is bent downward and secured by a pivot 63 to a bar 64, so that said clamping-member may be raised to the dotted position, Fig. 13, when it is desired to place or remove the work. The clamping-member is provided with a depending finger 65 which engages one side of the work so that the latter may be held in engagement with the front side of the gages or the carriage, hence by pushing forwardly on the carriage and drawing backwardly on the holder the work will be reliably held between the same while being moved back against the saw. Bar 64 slidingly fits in the dove-tail groove 49, and in order to prevent too much pressure thereon, which would cause it to bind in said slot, I provide finger 65 with oppositely-disposed shoulders 66, which bear upon the upper surface of the table. The pivoted end of clamping-member 61 also bears upon the upper surface of the table for the same purpose. Clamping-member 61 is provided at its rear end with a handle 67 and at its underside with a cushion 68 to prevent injury to the face of the type or plate engaged thereby.

69 designates a tool-shelf which is detachably secured to the front legs 1, and 70 designates a shelf extending from shelf 69 to receptacle 39.

From the above description it is apparent that I have produced a machine which is well adapted for the purpose intended and embodies all of the features of advantage above referred to.

Having thus described my invention, what I claim is:

1. A machine for trimming metal plates, having in combination with a table, a shaft having a threaded end and a shoulder near said end, a saw mounted on said shaft and bearing against said shoulder, an externally threaded bushing loosely fitted on said shaft for clamping said saw against said shoulder, a clamping nut engaging the threaded end of said shaft to hold the bushing against said saw, a disk collared on said bushing and bearing against said saw, a nut engaging said bushing to secure said disk against said saw, and trimmers adjustably extending through said disk and saw, to coöperate with said saw in working sheet metal.

2. A machine for trimming metal plates, comprising with a table and a saw mounted for rotation therethrough, an adjustable hood supported by said table and carried over said saw, said hood comprising a semi-cylindrical boxing having a horizontal shaft near one end of its diametrical edge, a vertical standard secured to said table and having said horizontal shaft secured thereto for vertical adjustment.

3. A machine for trimming metal plates, comprising with a table and a saw mounted for rotation therethrough, an adjustable hood supported by said table and carried over said saw, said hood comprising a semi-cylindrical boxing having a horizontal shaft near one end of its diametrical edge, a slotted projection mounted on said table and a vertical standard having a slot mounted for horizontal adjustment on said projection, said horizontal shaft being secured in said vertical slot for vertical adjustment.

In testimony whereof I affix my signature, in the presence of two witnesses.

GEORGE H. VINING.

Witnesses:
F. G. FISCHER,
M. COX.